(12) United States Patent
Ye

(10) Patent No.: US 10,780,379 B2
(45) Date of Patent: Sep. 22, 2020

(54) COMPOSITE MATERIAL FOR AIR PURIFICATION, PREPARATION METHOD THEREFOR AND APPLICATION THEREOF

(71) Applicant: Climasys DataSmart Technology CO., LTD., Shanghai (CN)

(72) Inventor: Yang Ye, Shanghai (CN)

(73) Assignee: Climasys DataSmart Technology CO., LTD., Shanghai (CN)

( * ) Notice: Subject to any disclaimer, the term of this patent is extended or adjusted under 35 U.S.C. 154(b) by 0 days.

(21) Appl. No.: 16/331,532

(22) PCT Filed: Aug. 18, 2017

(86) PCT No.: PCT/CN2017/098148
§ 371 (c)(1),
(2) Date: Mar. 8, 2019

(87) PCT Pub. No.: WO2018/045867
PCT Pub. Date: Mar. 15, 2018

(65) Prior Publication Data
US 2019/0201823 A1 Jul. 4, 2019

(30) Foreign Application Priority Data
Sep. 9, 2016 (CN) .......................... 2016 1 0816476

(51) Int. Cl.
*B01D 46/24* (2006.01)
*B01D 46/00* (2006.01)
(Continued)

(52) U.S. Cl.
CPC ........ *B01D 39/1676* (2013.01); *B01D 53/04* (2013.01); *B01D 53/261* (2013.01);
(Continued)

(58) Field of Classification Search
None
See application file for complete search history.

(56) References Cited

U.S. PATENT DOCUMENTS 4,172,744 A * 10/1979 Ishikawa ............. C04B 20/1055
156/79
4,395,332 A 7/1983 Klein et al.
(Continued)

FOREIGN PATENT DOCUMENTS

| CN | 1220615 A | 6/1999 |
|---|---|---|
| CN | 201154269 Y | 11/2008 |

(Continued)

OTHER PUBLICATIONS

Hollabaugh et al., "Carboxymethylcellulose . . . Uses and Applications." Ind. Eng. Chem. (1945) vol. 37, No. 10, pp. 943-947.*

*Primary Examiner* — Daniel Berns
(74) *Attorney, Agent, or Firm* — Ling Wu; Stephen Yang; Ling and Yang Intellectual Property

(57) ABSTRACT

A composite material for purifying air includes a porous foam material which is an open-cell polyurethane foam net; and a mixture sprayed on the interior and/or the surface of the porous foam material, the mixture including an absorbent material, a treating agent and an adhesive; wherein the adsorptive material is diatomite, and the treating agent is alkali solution.

19 Claims, 2 Drawing Sheets

(51) Int. Cl.

| | |
|---|---|
| *B01D 39/16* | (2006.01) |
| *B01D 53/02* | (2006.01) |
| *B01D 53/04* | (2006.01) |
| *B01D 53/14* | (2006.01) |
| *B01D 53/26* | (2006.01) |
| *B01D 53/40* | (2006.01) |
| *B01D 53/50* | (2006.01) |
| *B01D 53/78* | (2006.01) |
| *B01D 53/82* | (2006.01) |
| *B01J 20/04* | (2006.01) |
| *B01J 20/14* | (2006.01) |
| *B01J 20/22* | (2006.01) |
| *B01J 20/24* | (2006.01) |
| *B01J 20/26* | (2006.01) |
| *B01J 20/28* | (2006.01) |
| *B01J 20/30* | (2006.01) |
| *B01J 20/32* | (2006.01) |

(52) U.S. Cl.
CPC ......... *B01D 53/263* (2013.01); *B01D 53/502* (2013.01); *B01D 53/504* (2013.01); *B01D 53/78* (2013.01); *B01J 20/041* (2013.01); *B01J 20/043* (2013.01); *B01J 20/14* (2013.01); *B01J 20/22* (2013.01); *B01J 20/24* (2013.01); *B01J 20/261* (2013.01); *B01J 20/262* (2013.01); *B01J 20/28026* (2013.01); *B01J 20/28045* (2013.01); *B01J 20/3042* (2013.01); *B01J 20/3212* (2013.01); *B01J 20/3223* (2013.01); *B01J 20/3236* (2013.01); *B01D 46/0036* (2013.01); *B01D 46/2411* (2013.01); *B01D 2239/0407* (2013.01); *B01D 2239/0464* (2013.01); *B01D 2239/1216* (2013.01); *B01D 2239/1241* (2013.01); *B01D 2251/304* (2013.01); *B01D 2251/604* (2013.01); *B01D 2251/606* (2013.01); *B01D 2252/202* (2013.01); *B01D 2253/11* (2013.01); *B01D 2257/302* (2013.01); *B01D 2257/80* (2013.01); *B01D 2279/40* (2013.01)

(56) References Cited

U.S. PATENT DOCUMENTS

| | | |
|---|---|---|
| 2001/0039879 A1 | 11/2001 | Chapman |
| 2008/0149561 A1 | 6/2008 | Chu et al. |

FOREIGN PATENT DOCUMENTS

| | | |
|---|---|---|
| CN | 201175631 Y | 1/2009 |
| CN | 102000515 A | 4/2011 |
| CN | 102215941 A | 10/2011 |
| CN | 102553393 A | 7/2012 |
| CN | 103964384 A | 8/2014 |
| CN | 205360859 U | 7/2016 |
| CN | 205505243 U | 8/2016 |
| CN | 106268041 A | 1/2017 |
| JP | S5520691 A | 2/1980 |
| SE | 436472 B | 12/1984 |

* cited by examiner

COMPOSITE MATERIAL FOR AIR PURIFICATION, PREPARATION METHOD THEREFOR AND APPLICATION THEREOF

CROSS-REFERENCE TO RELATED APPLICATIONS

The present application is a U.S. National Phase Entry of International PCT Application No. PCT/CN2017/098148 having an international filing date of Aug. 18, 2017, which claims priority to Chinese Patent Application No. 201610816476.1 filed on Sep. 9, 2016. The present application claims priority and the benefit of the above-identified applications and the above-identified applications are incorporated by reference herein in their entirety.

TECHNICAL FIELD

The present application generally relates to, but is not limited to, the field of air purification.

BACKGROUND

Pollutants such as $SO_2$ in the atmospheric environment will cause harm to human body if they exceed a certain limit. This kind of problem is getting more and more attention. At the same time, precision instruments, electronic apparatuses or factory process conditions, etc. have very strict restrictions on the concentration of various kinds of gaseous pollutants, even exceeding the requirements of general civil air cleanliness. In order to remove these harmful substances from the atmosphere, people usually adopt adsorption methods and chemical reaction methods. The materials used in the adsorption method are mainly activated carbon, activated alumina, silica gel, molecular sieve, and the like.

SUMMARY OF THE INVENTION

The following is an overview of the topics described in detail herein. This summary is not intended to limit the scope of protection of the claims.

Whether it is for civil use or industrial use, the technologies currently used in air purification products sold on the market generally includes an adsorption method and a chemical reaction method.

The adsorption method mainly uses activated carbon and alumina products, as well as activated carbon or alumina materials impregnated with chemical agents.

For the chemical reaction method, an industrial chemical reaction method uses devices represented by spray towers applied to chemical plants, power plants, etc.

The disadvantages of these methods and devices are as follows:

(1) The adsorption capacity of the device is limited.

(2) The industrial method uses a large apparatus and can handle a large amount of air, the purification efficiency can be kept >90% for a long time by matching with the attached apparatus. However, the method has high cost, high energy consumption and large floor area, and requires special personnel to maintain and use. Under the condition of large air volume application, the use cost of these methods is too high. It has no practical significance for civil and high-tech places (e.g., electronic factory buildings, data centers, etc.).

The purification efficiency mentioned above: $\eta_t=(C_0-C_T)/C_0*100\%$; wherein: $\eta_t$: the purification rate of chemical purification materials for air pollutants in t time period; $C_0$: the concentration of certain pollutants in the gas is $mg/m^3$; $C_t$: the concentration of pollutants after air passes through the purification material in time period t, and the time unit can be hours, days, months, etc. The comparison time of different purification materials should be the same.

(3) The resistance of the material itself is too large, and the energy consumption of the power required for ventilation is large, especially for some places requiring large air volume.

(4) According to the G1 level standard required by American Standard ANSI/ISA S71.04-1985 for electronic production and data center, etc., the purification effect is difficult to maintain under the condition of large air volume. For example, the $SO_2$ concentration is reduced to be less than 10 ppb, and the air passing speed, resistance, power consumption index, use time and the like have requirements at the same time, which cannot be achieved by existing methods. Further, the special standards with special requirements and technological requirements cannot be achieved.

In addition, products such as activated carbon and alumina impregnated with the medicament have higher purification efficiency than pure activated carbon and the like, but have disadvantages such as rapid reduction of purification effect with use time, excessive resistance and the like.

Therefore, there is still a need on the market for composite materials, which are used for air purification and have high treatment efficiency, low energy consumption and long-term retention of filtration efficiency, and apparatus containing such composite materials. This application provides a composite material for purifying air. The composite material for purifying air provided by this application can exhibit the advantages of no obvious reduction in filtration efficiency when being used for a long time, and has high treatment efficiency and low energy consumption, so that the production cost can be obviously reduced.

The application provides a composite material for purifying air, which may include: a porous foam material and a mixture.

The porous foam material is an open-cell polyurethane foam net.

The mixture is sprayed on the interior and/or surface of the porous foam material, including an adsorptive material, a treating agent and an adhesive, wherein the adsorptive material is diatomite, and the treating agent is alkali solution.

In the composite material, the open-cell polyurethane foam net used in this application can be a commercially available product.

In the above or other embodiments, the porous foam material may have a pore number of 30 meshes to 60 meshes, optionally 40 meshes to 50 meshes, and further optionally about 45 meshes.

In the above or other embodiments, the porous foam material may generally have a thickness of 4 to 8 mm.

Those skilled in the art will understand that the composite material of this application may take the form of a sheet of carrier porous foam material.

In the above or other embodiments, the adhesive may be selected from one or more of epoxy resin adhesive, butadiene acrylic copolymer adhesive, polyvinyl acetate adhesive, acrylic adhesive, polyurethane adhesive, and polyacrylate adhesive. Optionally, the adhesive is a butadiene acrylic copolymer adhesive. Those skilled in the art will understand that the adhesive can be reasonably selected according to the specific type of the treating agent and the desired technical effect.

In the composite material, these adhesives used in this application can be commercially available products.

In the above or other embodiments, the adsorptive material may have 60 meshes to 300 meshes. Optionally, the diatomite has a specification that it can absorb at least about 100-200 g water per 100 g diatomite, and optionally the specification of the diatomite is about 170 g water per 100 g diatomite.

In the above or other embodiments, the spraying amount of the mixture may be 200 $g/m^2$ to 250 $g/m^2$, optionally about 225 $g/m^2$, relative to the outer surface of the porous foam material per square metre.

In the above or other embodiments, the alkali solution may be an aqueous solution having a concentration of alkali of 5 wt % to 50 wt %, optionally 30 wt % to 50 wt %.

In the above or other embodiments, the alkali may be selected from one or more of sodium hydroxide, calcium hydroxide, and sodium carbonate.

In the above or other embodiments, the weight ratio of the adsorptive material, the treating agent and the adhesive in the mixture may be 1:5-7:1.3-1.7, optionally 1:6:1.5. In the above range, the adsorptive material can be effectively adhered to the porous foam material without causing the adsorptive material to be lost with the wind in the filtration process, and at the same time, the filtration resistance of an assembly formed by stacking 2 to 4 pieces of the composite material is less than 65 Pa at a larger treatment air volume such as an air volume no less than 1500 $m^3/h \cdot m^2$.

In the above or other embodiments, the mixture may further include a suspending agent.

In the above or other embodiments, the suspending agent may be a 2 wt % to 5 wt % sodium carboxymethyl cellulose aqueous solution.

In the above or other embodiments, the suspending agent may be 5 wt % to 10 wt % of the total weight of the mixture.

In the above or other embodiments, the composite material may further include a humectant sprayed on the interior and/or surface of the porous foam material to which the mixture has been sprayed.

In the above or other embodiments, the humectant may be glycerol.

In the above or other embodiments, the amount of the humectant may be 3 wt % to 5 wt % of the total weight of the mixture.

On the other hand, this application also provides a method for preparing a composite material for purifying air as described above, the method including: dissolving alkali in water to obtain a treating agent; uniformly mixing the adsorptive material and the treating agent to obtain a primary mixture; adding the adhesive into the primary mixture and uniformly mixing to obtain a mixture; optionally, adding a suspending agent into the mixture and uniformly mixing; and spraying the mixture or the mixture containing the suspending agent onto the porous foam material to prepare the composite material.

In the above or other embodiments, the method further includes uniformly spraying the humectant onto the composite material.

Those skilled in the art will understand that the spraying can be performed by methods known in the art, such as uniform spraying by high pressure air.

In yet another aspect, this application provides a composite material for purifying air, which is prepared according to the method described above.

In the above or other embodiments, the resistance of the monolithic composite material is no more than 15 Pa at an air volume no less than 1500 $m^3/h \cdot m^2$. In the above or other embodiments, under the condition that the inlet air volume is no less than 1500 $m^3/h \cdot m^2$, the resistance of the assembly formed by stacking two, three or four pieces of the composite material is no more than 65 Pa, and the sulfur dioxide concentration in the outlet air is less than 10 ppb. The resistance is detected by measuring the air pressure before passing through the assembly and the air pressure after passing through the assembly when the air inlet volume is no less than 1500 $m^3/h \cdot m^2$, so that the resistance of the assembly is no more than 65 Pa.

In yet another aspect, this application provides a method of purifying air, the method includes: controlling the relative humidity of the air to be purified at 50% to 90%, optionally 50% to 75%, and further optionally 75%; and passing air having a controlled relative humidity through the composite material as described above.

In the above or other embodiments, the method may further include performing primary efficiency filtration on the air to be purified to filter out particles with a particle size greater than 5 μm in the air, thereby being beneficial to reducing the risk of the particles in the air blocking the composite material.

In the above or other embodiments, the method may further include performing medium efficiency filtration on the air passing through the composite material to filter out particles with a particle size of 1 to 5 Lm in the air, so as to avoid the adsorptive material in the composite material from being fallen off and lost in the treated air due to large air volume, thereby affecting the quality of the treated air.

In the above or other embodiments, the treating agent of the composite material may be alkali, and the method is used for treating the acidic gas in the air, optionally the acidic gas having no more than 1000 ppb of sulfur dioxide content, and the sulfur dioxide content in the air passing through the composite material is less than 10 ppb at an air volume no less than 1500 $m^3/h \cdot m^2$ and under the condition that the relative humidity of the air is 50% to 90%; when the sulfur dioxide content in the air passing through the composite material is more than 10 ppb after being used for a time period, the used composite material needs to be replaced, wherein the ppb is a unit by weight.

In the above or other embodiments, the relative humidity can be controlled by a humidity sensor on the air inlet side and a humidity controller connected to the humidity sensor, as well as a humidifying device connected to the humidity controller.

In yet another aspect, this application provides an apparatus for purifying air, the apparatus may include: a closed shell, a humidifying unit, a chemical processing unit and a fan.

The closed shell is provided with an air inlet at one end of the shell and an air outlet at the other end of the shell.

The humidifying unit is disposed inside the closed shell. The humidifying unit is located downstream of the air inlet, and includes a humidity sensor and a humidity controller connected to the humidity sensor, as well as a humidifying device connected to the humidity controller. The humidifying unit is provided to control the relative humidity of air at 50% to 90%, optionally 50% to 75%, and further optionally 75%.

The chemical processing unit is disposed inside the closed shell. The chemical processing unit is located downstream of the humidifying unit and includes the composite material as described above. The chemical processing unit is provided to treat air having a controlled relative humidity to remove acidic gas in the air.

The fan is disposed inside the closed shell. The fan is located downstream of the chemical processing unit and provided to allow air to pass through the apparatus for purifying air at a certain wind speed.

An optional primary efficiency filtering unit, if present, is disposed inside the closed shell. The primary efficiency filtering unit is located downstream of the air inlet and upstream of the humidifying unit, and is provided to filter out particles with a particle size greater than 5 μm.

An optional medium efficiency filtering unit, if present, is disposed inside the closed shell. The medium efficiency filtering unit is located downstream of the chemical processing unit and upstream of the fan, and disposed to filter out particles with a particle size of 1 to 5 μm in the air.

In the above or other embodiments, the composite material in the chemical processing unit may be formed into any suitable shape, for example, may be formed into a hollow cylinder, wherein one end of the hollow cylinder is sealed and the other end is opened as an air outlet side, so that air passes through a side wall of the hollow cylinder and enters a hollow portion of the hollow cylinder, and then flows out from an air outlet side.

In the above or other embodiments, the hollow cylinder may be connected to the medium efficiency filtering unit through its air outlet side.

In the above or other embodiments, the chemical processing unit is composed of a certain number of hollow cylinders formed of the above-mentioned composite materials, for example, 1 to 10, 1 to 20, etc.

In the above or other embodiments, the hollow cylinder may be formed by stacking two to four pieces of composite materials.

In the above or other embodiments, the apparatus is shown in FIG. 2.

In the above or other embodiments, the apparatus is shown in FIG. 3.

In the above or other embodiments, the apparatus may further include detectors provided at the air inlet and the air outlet to detect the pollutant concentration of air entering the air inlet or the pollutant concentration of air exiting the air outlet, thereby calculating the filtration efficiency of the apparatus. When the filtration efficiency of the apparatus is lower than 99%, the composite material of the apparatus can be replaced. In general, there will be several fresh air main engines working at the same time. The one that needs to be replaced needs to be shut down, but the whole fresh air unit does not. At this time, there are still other fresh air hosts working instead of it, and the replacement time will not exceed 1 hour.

In the above or other embodiments, the humidifying device may be one or more of a high pressure sprayer, an electrode humidifying device, an ultrasonic humidifier, and a wet film.

In the above or other embodiments, the humidity content in the air on the air inlet side is detected by the humidity sensor. When the humidity content in the air on the air inlet side is less than 50%, the humidity controller connected to the humidity sensor turns on the humidifying device, and when the humidity of the air on the air inlet side is within this range, turns off the humidifying device. In addition, it should be noted that if there are water droplets on the surface of the composite material, the condensed water droplets will accumulate and spread to other parts of the apparatus, thus causing many safety problems. In order to prevent water droplets of the humidifying device from contacting the composite material, the humidifying device is set at a certain safe distance from the composite material, and the safe distance can be reasonably selected according to actual conditions such as apparatus size and the like.

In the above or other embodiments, the humidifying device is disposed on the air inlet side, and the humidifying device is uniformly distributed around the air inlet side of the composite material, so that the humidifying device can uniformly spray air on the air inlet side. The number of the humidifying devices can be selected according to actual needs as long as the humidifying devices can uniformly spray air on the air inlet side.

In the above or other embodiments, the primary efficiency filtering unit may be a filter screen having a pore number of 100 meshes.

In the above or other embodiments, the medium efficiency filtering unit may be a filter screen with a pore number between 300 meshes and 500 meshes.

The inventors of the present application have found in the experimental process that the stability of the treatment efficiency of the composite material can be effectively maintained by controlling the relative humidity of the air within the range of 50% to 90% before the air passes through the composite material. Moreover, the sulfur dioxide content in the air passing through the purification apparatus of this application is less than 10 ppb at the air volume no less than 1500 m$^3$/h·m$^2$ and under the condition that the relative humidity of the air is 50% to 90%.

Additional features and advantages of this application will be set forth in the description which follows, and in part will be apparent from the description, or may be learned by practice of this application. The objects and other advantages of this application can be realized and attained by the structures pointed out in the specification, claims and drawings.

BRIEF DESCRIPTION OF DRAWINGS

The accompanying drawings are used to provide a further understanding of the embodiments of the application and form a part of the specification. The embodiments of the present application will be described in further detail below with reference to the drawings and detailed description, and are not to be construed as limiting the embodiments of the application.

DETAILED DESCRIPTION

Figure 1:
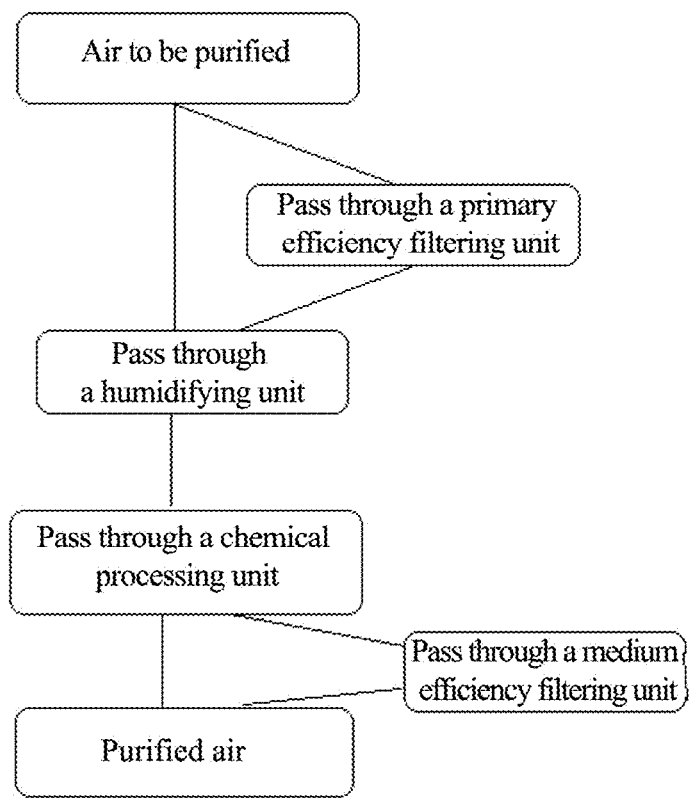
FIG. 1 is a flowchart of a method for purifying air according to the application.
Figure 2:
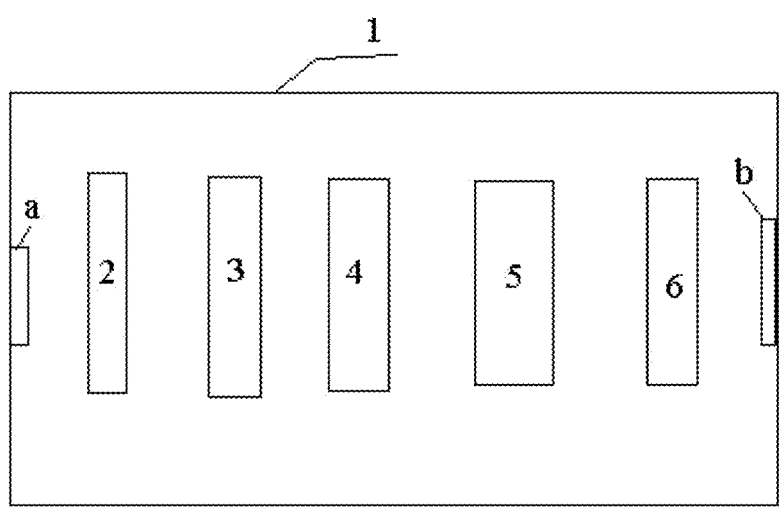
FIG. 2 is a schematic plan view of an apparatus for purifying air according to one embodiment of the application, in which a represents an air inlet, 1 represents a closed shell, 2 represents a primary efficiency filtering unit, 3 represents a humidifying unit, 4 represents a chemical filter unit, 5 represents a medium efficiency filtering unit, 6 represents a fan, and b represents an air outlet.

Embodiments of the application will be described below by way of examples, and those skilled in the art should realize that these specific examples are only exemplary and are used to illustrate and explain the application and are not intended to limit the scope of protection of the application. According to the teaching of the application, the improvement of the technical scheme of the application combined with the prior art is within the protection scope of the application. Without conflict, the embodiments in the application and the features in the embodiments can be combined with each other arbitrarily.

In the following Examples, the raw materials used are all commercially available products. Unless otherwise specified, the reagents used in the following Examples are all commercially available and sources of the same reagents are the same.

Example 1

A composite material for purifying air includes: a polyurethane foam net and a mixture.

The polyurethane foam net (purchased from Changzhou Shunda Air Purification Material Co., Ltd) has a pore number of 50 meshes and a thickness of 8 mm.

The mixture is sprayed on the interior and/or surface of the polyurethane foam net. The mixture contains: 220 g diatomite particles with a granularity of 200 meshes (purchased from Shengzhou Huali Diatomite Products Co., Ltd.)(wherein each 100 g of diatomite can absorb about 170 g water, powder), 1540 g treating agent, 374 g butadiene acrylic copolymer adhesive (purchased from Shanghai Motian Chemical Co., Ltd.), and 112 g suspending agent, which is a 2 wt % sodium carboxymethyl cellulose aqueous solution.

Preparation Method:

540 g sodium carbonate (purchased from Shanghai Jingge Trading Co., Ltd.) was dissolved in 1000 g water to obtain a treating agent with pH of 10.

Diatomite particles were uniformly mixed with the treating agent to obtain a primary mixture.

A butadiene acrylic copolymer adhesive was added into the primary mixture and uniformly mixed to obtain a mixture.

Sodium carboxymethyl cellulose (purchased from Tianjin Fuchen Chemical Reagent Factory) was added to water to prepare 112 g sodium carboxymethyl cellulose aqueous solution with a concentration of 2 wt % as a suspending agent.

The suspending agent was added into the mixture and uniformly mixed to obtain a final mixture.

Then, the final mixture was sprayed onto the polyurethane foam net at standard of a spraying amount of 200 g/m$^2$ to obtain the composite material (length×width=2000 mm×1000 mm).

Example 2

A composite material for purifying air includes: a polyurethane foam net and a mixture.

The polyurethane foam net (purchased from Changzhou Shunda Air Purification Material Co., Ltd) has a pore number of 30 meshes and a thickness of 4 mm.

The mixture is sprayed on the interior and/or surface of the polyurethane foam net. The mixture contains: 270 g diatomite particles with a granularity of 60 meshes (purchased from Shengzhou Huali Diatomite Products Co., Ltd.)(wherein each 100 g of diatomite can absorb about 100 g water, powder), 1350 g treating agent, 351 g butadiene acrylic copolymer adhesive (purchased from Shanghai Wanji Jianye Building Materials Co., Ltd.), and 219 g suspending agent, which is a 5 wt % sodium carboxymethyl cellulose aqueous solution.

Preparation Method:

540 g sodium hydroxide (commercially available, powder) was dissolved in 810 g water to obtain a treating agent with pH of 13.

Diatomite particles were uniformly mixed with the treating agent to obtain a primary mixture.

A butadiene acrylic copolymer adhesive was added into the primary mixture and uniformly mixed to obtain a mixture.

Sodium carboxymethyl cellulose (purchased from Tianjin Fuchen Chemical Reagent Factory) was added to water to prepare 219 g sodium carboxymethyl cellulose aqueous solution with a concentration of 5 wt % as a suspending agent.

The suspending agent was added into the mixture and uniformly mixed to obtain a final mixture.

Then, the final mixture was sprayed onto the polyurethane foam net at the standard of a spraying amount of 250 g/m$^2$ to obtain the composite material (length×width=2000 mm×1000 mm).

Example 3

A composite material for purifying air includes: a polyurethane foam net and a mixture.

The polyurethane foam net (purchased from Changzhou Shunda Air Purification Material Co., Ltd) has a pore number of 60 meshes and a thickness of 6 mm.

The mixture is sprayed on the interior and/or surface of the polyurethane foam net. The mixture contains: 240 g diatomite particles with a granularity of 200 meshes (purchased from Shengzhou Huali Diatomite Products Co., Ltd.)(wherein each 100 g of diatomite can absorb about 200 g water, powder), 1440 g treating agent, 360 g butadiene acrylic copolymer adhesive (purchased from Shanghai Wanji Jianye Building Materials Co., Ltd.), and 200 g suspending agent, which is a 5 wt % sodium carboxymethyl cellulose aqueous solution.

Preparation Method:

432 g sodium hydroxide (commercially available, powder) was dissolved in 1008 g water to obtain a treating agent with pH of 12.

Diatomite particles were uniformly mixed with the treating agent to obtain a primary mixture.

A butadiene acrylic copolymer adhesive was added into the primary mixture and uniformly mixed to obtain a mixture.

Sodium carboxymethyl cellulose (purchased from Tianjin Fuchen Chemical Reagent Factory) was added to water to prepare 200 g sodium carboxymethyl cellulose aqueous solution with a concentration of 5 wt % as a suspending agent.

The suspending agent was added into the mixture and uniformly mixed to obtain a final mixture.

Then, the final mixture was sprayed onto the polyurethane foam net at the standard of a spraying amount of 225 g/m$^2$ to obtain the composite material (length×width=2000 mm×1000 mm).

Example 4

The formula and preparation method of the composite material for purifying air were the same as in Example 1, except that the thickness of polyurethane foam net was 4 mm.

Example 5

The formula and preparation method of the composite material for purifying air were essentially the same as in Example 1, except that the composite material also contained glycerol as a humectant (purchased from Taobao-Xinyuan Experiment), the amount of glycerol is 3 wt % of the mixture, and a step of spraying glycerol on the composite material was added at the end of the preparation method.

Comparative Example 1

The composite material was prepared using the formula and method of Example 1, except that the diatomite was replaced with the same amount of activated alumina particles (purchased from Langfang Asia Pacific Longxing Molecular Sieve Chemical Co., Ltd., alumina content ($Al_2O_3$): 92 wt %, pore volume: ≥0.38 $g/cm^3$; water absorption rate: ≥50%).

Comparative Example 2

The composite material was prepared using the formula and method of Example 1, except that the diatomite was replaced with the same amount of activated carbon particles (purchased from Shanghai Quanhu Activated Carbon Co., Ltd., coconut shell activated carbon: 1-2 mm; Specific surface area: ≤1100 $m^2/g$; total pore volume: ≤0.9 $cm^3/g$).

Comparative Example 3

The composite material was prepared using the formula and method of Example 1, except that the polyurethane foam net was replaced with carbon fiber (purchased from Changzhou Shunda Air Purification Material Co., Ltd., HCC unidirectional carbon fiber braid).

Comparative Example 4

The composite material was prepared using the formula and method of Example 1, except that polyurethane foam net was replaced with glass fiber (purchased from Changzhou Shunda Air Purification Material Co., Ltd., ECD450).

Example 6

Figure 3:
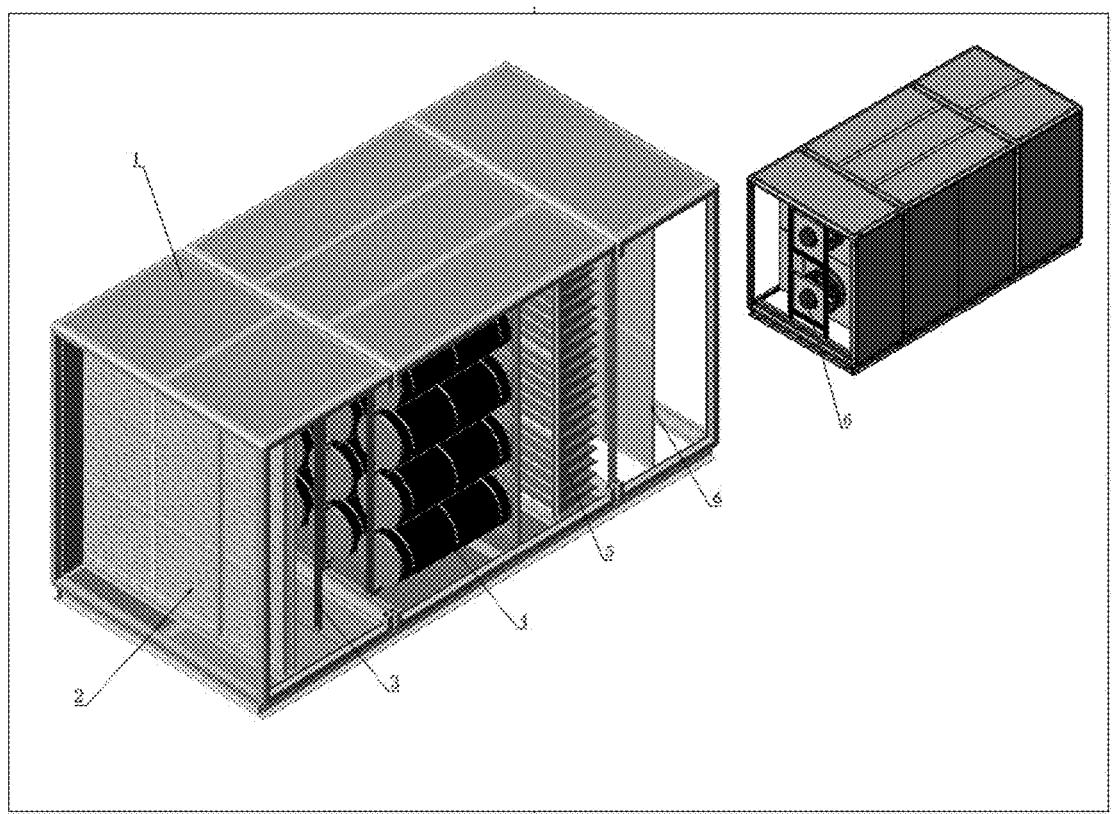
FIG. 3 is a schematic diagram of an apparatus for purifying air according to one embodiment of the application, in which 1 represents a closed shell, 2 represents a primary efficiency filtering unit, 3 represents a humidifying unit, 4 represents a chemical filter unit, 5 represents a medium efficiency filtering unit, and 6 represents a fan.

The apparatus shown in FIG. 3 was used to purify the air and test the properties of the composite material. The apparatus includes a closed shell provided with an air inlet at one end of the shell and an air outlet at the other end of the shell, and the interior of the closed shell is provided with: a humidifying unit, a chemical processing unit, a fan, a primary efficiency filtering unit, and a medium efficiency filtering unit.

The humidifying unit is located downstream of the air inlet, and includes a humidity sensor, and a humidity controller connected to the humidity sensor, as well as a humidifying device connected to the humidity controller. The humidifying unit is provided to control the relative humidity of air at 50% to 90%, such as 52% used in a specific test in this Example.

The chemical processing unit is located downstream of the humidifying unit and including the composite material. The chemical processing unit is provided to treat air having a controlled relative humidity to remove acidic gas in the air.

The fan is located downstream of the chemical processing unit to provide power so that air can pass through the apparatus for purifying air at a certain wind speed.

The primary efficiency filtering unit is located between the air inlet and the humidifying unit and used to filter out particles with particle sizes larger than 5 Lm in the air entering from the air inlet.

The medium efficiency filtering unit is located between the chemical processing unit and the fan and used to filter out particles with particle sizes of 1 to 5 Lm in the air.

Figure 4:
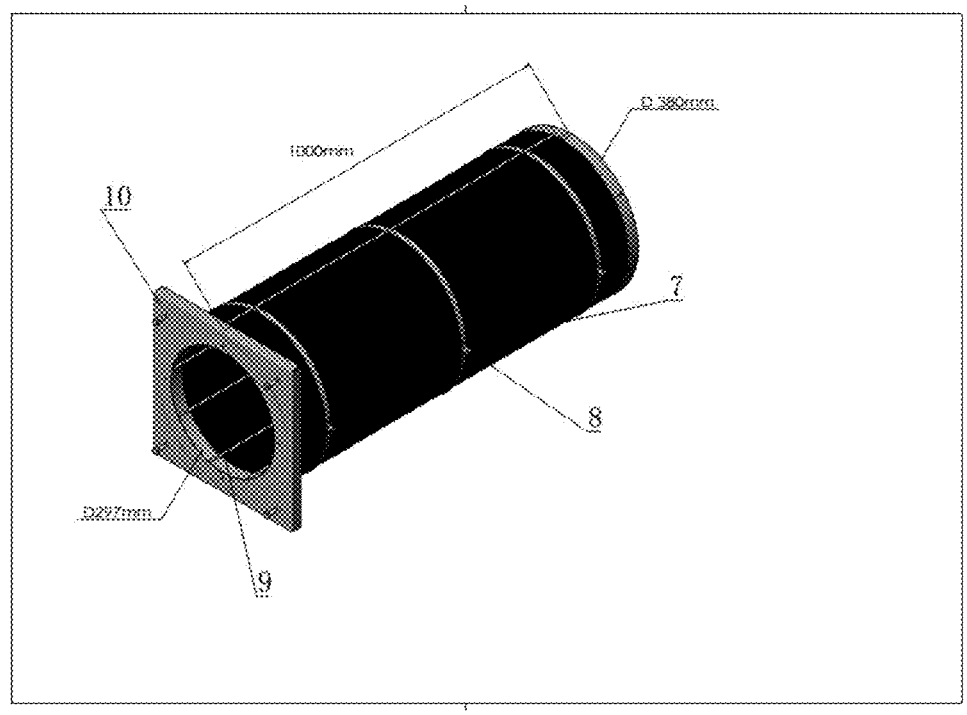
FIG. 4 is a schematic diagram of a hollow cylinder molded from the composite material according to one embodiment of the application, in which 7 represents a sidewall molded from the composite material, 8 represents an air inlet side, 9 represents an air outlet side, and 10 represents a structural member for connection and fixation.

In this example of the application, the primary efficiency filtering unit is a polyester synthetic fiber material net with 100 meshes. The chemical processing unit is a hollow cylinder molded from four pieces of composite materials prepared in Example 1, and its structure is shown in FIG. 4. The chemical processing unit further includes a pressure sensor arranged outside both ends of the hollow cylinder. The medium efficiency filtering unit is a white polyester synthetic fiber material net with a pore number of 300 meshes to 500 meshes. The medium efficiency filtering screen further includes a sulfur dioxide detector arranged on the air outlet side thereof. The fan is arranged on the air outlet side of the medium efficiency filtering screen.

When treating air with sulfur dioxide content of 0.1 ppm, turning on the fan, the air passes through the primary efficiency filtering screen with an air volume of 1500 $m^3/h \cdot m^2$, and the humidity sensor is used to detect the humidity of the air; when the humidity of the air is lower than 50%, the humidity controller controls the humidifying device to start spraying, and stops spraying when the humidity of the air is detected to be within the range of 50% to 90%. Air with a humidity of 50% to 90% enters through the circumferential side wall of the hollow cylinder, exits from the open end of the cylinder and passes through the medium efficiency filtering screen. The pressure detection device is used to detect the air pressure outside the two ends of the hollow cylinder, and the sulfur dioxide detector is used to detect the sulfur dioxide content in the air leaving the apparatus at the air outlet side of the medium efficiency filtering screen. The apparatus is used for continuous treatment until the concentration of sulfur dioxide in the air on the air outlet side is higher than 10 ppb, then the chemical processing unit needs to be replaced and the service life of the chemical processing unit is calculated based on this judgment. See Table 1 for specific results.

Then, the composite materials prepared in Examples 2 to 5 and Comparative Examples 1 to 4 were replaced with the composite materials of Example 1, to perform the treatments, respectively, and the obtained results are shown in Table 1.

TABLE 1

Results of air purification using apparatuses including different composite materials

| Experimental Number of Composite Materials | Air humidity, % | Resistance, Pa | $SO_2$ concentration at the air outlet side, ppb | $SO_2$ Treatment Efficiency | Service life (hours) |
|---|---|---|---|---|---|
| Example 1 | 52 | 40 | 0 | 100% | 3500 |
| Example 2 | 52 | 30 | 0 | 100% | 2400 |
| Example 3 | 52 | 45 | 0 | 100% | 3000 |
| Example 4 | 52 | 38 | 0 | 100% | 2800 |
| Example 5 | 52 | 42 | 0 | 100% | 4000 |

TABLE 1-continued

Results of air purification using apparatuses including different composite materials

| Experimental Number of Composite Materials | Air humidity, % | Resistance, Pa | $SO_2$ concentration at the air outlet side, ppb | $SO_2$ Treatment Efficiency | Service life (hours) |
|---|---|---|---|---|---|
| Comparative Example 1 | 52 | 38 | 0 | 100% | 1800 |
| Comparative Example 2 | 52 | 35 | 0 | 100% | 2000 |
| Comparative Example 3 | 52 | 85 | 0 | 100% | 1000 |
| Comparative Example 4 | 52 | 90 | 0 | 100% | 1000 |

In addition, the composite materials of Examples 1 to 6 of this application can all meet the G1 standard required by American Standard ANSI/ISA S71.04-1985 for electronic production, data centers, etc. (sulfur dioxide content is required to be between 0-10 ppb).

From this, it can be seen that the composite materials provided in Examples 1 to 6 of this application, when treating air containing no more than 100 ppb of sulfur dioxide at a large air volume of 1500 m³/h·m², the resistance of the composite material is no more than 65 Pa, and the sulfur dioxide treatment efficiency can be 100% for more than 2400 hours continuously, which can not only effectively control the content of acid pollution gas in the air, but also ensure low energy consumption and high treatment efficiency.

In addition, the method and apparatus for purifying air provided by the Examples of the application can meet the G1 standard sulfur dioxide content of 0-10 ppb required by the American Standard ANSI/ISA S71.04-1985 for electronic production, data centers, etc. Therefore, the method and apparatus for purifying air provided by the application can be used in the production environment and data centers of large-scale precision apparatus, to provide favorable guarantee for the production of precision instruments and electronic apparatus.

Furthermore, by comparing the data measured by the materials of Example 1 and Comparative Examples 1 to 2 in Table 1, it can be seen that the combination of polyurethane foam net and diatomite can not only realize a small wind resistance value, but also realize a high purification rate and a longer service life at the same time, as compared with other adsorptive materials such as activated carbon particles and activated alumina particles.

Moreover, according to the data measured by the material of Example 5 in Table 1, the service life of the composite material of this application is significantly prolonged after the humectant is added. From the data measured by the materials of Comparative Examples 3 and 4 in Table 1, it can be seen that the combination of diatomite and other carriers such as carbon fiber or glass fiber can neither achieve the purpose of wind resistance less than 65 pa, nor can it be used to effectively remove sulfur dioxide, and the service life is relatively short.

The present disclosure is an example of principles of examples of the application, and is not intended to limit the application in any form or substance, or to limit the application to specific embodiments. It is apparent to those skilled in the art that the elements, methods, products, etc. of the technical solutions of the embodiments of the application can be varied, changed, modified, and evolved without departing from the principles, spirit, and scope as defined in the claims of the embodiments and technical solutions of the application as described above. These varied, changed, modified and evolved embodiments are all included in the equivalent embodiments of the application, and these equivalent embodiments are all included in the scope of the application defined by the claims. Although embodiments of the application may be embodied in many different forms, some embodiments of the application are described in detail herein. In addition, embodiments of the application include any possible combination of some or all of the various embodiments described herein, and are also included within the scope of the application as defined by the claims. All patents, patent applications and other cited materials mentioned anywhere in this application or in any one of the cited patents, cited patent applications or other cited materials are hereby incorporated by reference in their entirety.

The above disclosure is intended to be illustrative rather than exhaustive. For those skilled in the art, this specification will suggest many variations and alternatives. All such alternatives and variations are intended to be included within the scope of the present claims, wherein the term "including" means "including, but not limited to".

The description of alternative embodiments of the invention has been completed herein. Those skilled in the art will recognize other equivalent transformations of the embodiments described herein, which are also encompassed by the claims appended hereto.

INDUSTRIAL APPLICABILITY

The composite material for purifying air provided by the application can exhibit the advantages that the filtration efficiency will not be significantly reduced when being used for a long time, and can have high treatment efficiency and low energy consumption, so that the production cost can be significantly reduced, and the composite material can be effectively applied to the field of air purification. The preparation method of the composite material has strong operability.

What we claim is:

1. A composite material for purifying air, the composite material comprising:
    a porous foam material, which is an open-cell polyurethane foam net; and
    a mixture sprayed on the interior and/or surface of the porous foam material, comprising an adsorptive material, a treating agent and an adhesive;
    wherein the adsorptive material is diatomite, and the treating agent is alkali solution;
    wherein the composite material further comprises a humectant sprayed on the interior and/or surface of the porous foam material to which the mixture has been sprayed.

2. The composite material according to claim 1, wherein the mixture further comprises a suspending agent, the suspending agent is a 2 wt % to 5 wt % sodium carboxymethyl cellulose aqueous solution, and the suspending agent is 5 wt % to 10 wt % of the total weight of the mixture.

3. The composite material according to claim 1, the humectant is glycerol, and the amount of the humectant is 3 wt % to 5 wt % of the total weight of the mixture.

4. The composite material according to claim 1, wherein the adhesive is selected from one or more of epoxy resin adhesive, butadiene acrylic copolymer adhesive, polyvinyl acetate adhesive, acrylic adhesive, polyurethane adhesive and polyacrylate adhesive; and/or the porous foam material has a pore number of 30 to 60 meshes; and/or the granularity of the adsorptive material is 60-300 meshes; and/or the alkali solution is an aqueous solution having a concentration of alkali of 5 wt % to 50 wt %; and/or the spraying amount of the mixture is 200 $g/m^2$ to 250 $g/m^2$, with respect to the outer surface of the porous foam material per square metre; and/or the alkali is selected from one or more of sodium hydroxide, calcium hydroxide and sodium carbonate.

5. The composite material according to claim 4, wherein the mixture further comprises a suspending agent, the suspending agent is a 2 wt % to 5 wt % sodium carboxymethyl cellulose aqueous solution, and the suspending agent is 5 wt % to 10 wt % of the total weight of the mixture.

6. The composite material according to claim 4, the humectant is glycerol, and the amount of the humectant is 3 wt % to 5 wt % of the total weight of the mixture.

7. The composite material according to claim 1, wherein the weight ratio of the adsorptive material, the treating agent and the adhesive in the mixture is 1:5-7:1.3-1.7.

8. The composite material according to claim 7, wherein the mixture further comprises a suspending agent, the suspending agent is a 2 wt % to 5 wt % sodium carboxymethyl cellulose aqueous solution, and the suspending agent is 5 wt % to 10 wt % of the total weight of the mixture.

9. The composite material according to claim 7, the humectant is glycerol, and the amount of the humectant is 3 wt % to 5 wt % of the total weight of the mixture.

10. A method of preparing a composite material for purifying air according to claim 1, the method comprising:
dissolving alkali in water to obtain a treating agent;
uniformly mixing the adsorptive material and the treating agent to obtain a primary mixture;
adding the adhesive into the primary mixture and uniformly mixing to obtain a mixture;
adding a suspending agent into the mixture and uniformly mixing;
spraying the mixture or the mixture containing the suspending agent onto the porous foam material to produce a composite material; and
uniformly spraying the humectant onto the composite material.

11. A method of purifying air, the method comprising:
performing primary efficiency filtration on the air to be purified to filter out particles with a particle size larger than 5 μm in the air;
controlling the relative humidity of the air to be purified at 50% to 90%;
passing air having a controlled relative humidity through the composite material according to claim 1; and
performing medium efficiency filtration on the air passing through the composite material to filter out particles with a particle size of 1-5 μm in the air.

12. The method according to claim 11, wherein in the step of controlling the relative humidity, the relative humidity is controlled by a humidity sensor on the air inlet side and a humidity controller connected to the humidity sensor, as well as a humidifying device connected to the humidity controller.

13. The method according to claim 11, wherein the method is used to treat acidic gas in the air, and the acidic gas having no more than 1000 ppb of sulfur dioxide content.

14. The method according to claim 13, wherein in the step of controlling the relative humidity, the relative humidity is controlled by a humidity sensor on the air inlet side and a humidity controller connected to the humidity sensor, as well as a humidifying device connected to the humidity controller.

15. An apparatus for purifying air, the apparatus comprising:
a closed shell provided with an air inlet at one end of the shell and an air outlet at the other end of the shell;
a humidifying unit disposed inside the closed shell, the humidifying unit being located downstream of the air inlet, and including a humidity sensor, and a humidity controller connected to the humidity sensor, as well as a humidifying device connected to the humidity controller, the humidifying unit being provided to control the relative humidity of air at 50% to 90%;
a chemical processing unit disposed inside the closed shell, the chemical processing unit being located downstream of the humidifying unit and comprising the composite material according to claim 1, the chemical processing unit being provided to treat air having a controlled relative humidity to remove acidic gas in the air; and
a fan disposed inside the closed shell, the fan being located downstream of the chemical processing unit and provided to allow air to pass through the apparatus for purifying air at a certain wind speed;
an optional primary efficiency filtering unit, if present, being disposed inside the closed shell, and the primary efficiency filtering unit being located downstream of the air inlet and upstream of the humidifying unit, and being provided to filter out particles with a particle size greater than 5 μm;
an optional medium efficiency filtering unit, if present, being disposed inside the closed shell, the medium efficiency filtering unit being located downstream of the chemical processing unit and upstream of the fan, and being disposed to filter out particles with a particle size of 1 to 5 μm from the air.

16. The apparatus according to claim 15, wherein the humidifying device is one or more of a high pressure sprayer, an electrode humidifying device, an ultrasonic humidifier, and a wet film.

17. The apparatus according to claim 15, wherein the chemical processing unit comprises one or more hollow cylinders formed of the composite material, one end of which is sealed and the other end is opened as an air outlet side, so that air passes through a side wall of the hollow cylinder and enters a hollow portion of the hollow cylinder, and then flows out from an air outlet side.

18. The apparatus according to claim 17, wherein a plurality of sheet-like composite materials are stacked to form the hollow cylinder.

19. The apparatus according to claim 17, wherein the humidifying device is one or more of a high pressure sprayer, an electrode humidifying device, an ultrasonic humidifier, and a wet film.

* * * * *